United States Patent
Cohen et al.

(10) Patent No.: US 6,774,927 B1
(45) Date of Patent: Aug. 10, 2004

(54) VIDEO CONFERENCING METHOD AND APPARATUS WITH IMPROVED INITIALIZATION THROUGH COMMAND PRUNING

(75) Inventors: Aaron M. Cohen, Beaverton, OR (US); Ajay G. Gupta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,411

(22) Filed: Dec. 22, 1999

(51) Int. Cl.[7] .............................................. H04N 7/14
(52) U.S. Cl. .................... 348/14.1; 370/261; 348/14.01
(58) Field of Search ........................ 348/14.01–14.03, 348/14.08–14.12; 379/93.21, 93.32; 370/260–263; 709/204, 228; 345/753, 743

(56) References Cited

U.S. PATENT DOCUMENTS

| | | | | |
|---|---|---|---|---|
| 5,363,507 A | * | 11/1994 | Nakayama et al. | 345/743 |
| 5,764,278 A | * | 6/1998 | Nagao | 348/14.1 |
| 5,847,752 A | * | 12/1998 | Sebestyen | 348/14.12 |
| 5,859,979 A | * | 1/1999 | Tung et al. | 709/228 |
| 5,907,324 A | * | 5/1999 | Larson et al. | 345/753 |
| 5,933,602 A | * | 8/1999 | Grover | 709/224 |
| 6,025,870 A | * | 2/2000 | Hardy | 348/14.1 |
| 6,105,054 A | * | 8/2000 | Kawashima | 709/204 |
| 6,505,234 B1 | * | 1/2003 | Riddle | 709/204 |

* cited by examiner

*Primary Examiner*—George Eng
(74) *Attorney, Agent, or Firm*—Blakely, Sokoloff, Taylor & Zafman LLP

(57) ABSTRACT

A video conference method and apparatus for pruning mode commands received from an endpoint of a video conference so as to minimize the repetitive establishment and tearing down of video, audio and data streaming channels is described. Received mode commands are not immediately processed during call establishment of a video conference, but rather, the mode commands are stored in at least one data queue until the second phase of the capabilities exchange (i.e. initialization) is complete. The received mode commands are categorized into mutually exclusive groups of mode commands based upon the functions caused by each mode command. As the system removes the mode commands from the queue for processing, the system efficiently prunes the commands by processing only a selected sub-set of the grouped mode commands and ignoring the rest.

27 Claims, 6 Drawing Sheets

| | | | |
|---|---|---|---|
| AIMAIA | = | H230_AIM, | H230_AIA; |
| ACEACZ | = | H230_ACE, | H230_ACZ; |
| VISVIA | = | H230_VIS,<br>H230_VIA2, | H230_VIA;<br>H230_VIA3; |
| MCC | = | H230_MCC, | H230_CANCEL_MCC; |
| MIZ | = | H230_MIZ, | H230_CANCEL_MIZ; |
| MIS | = | H230_MIS, | H230_CANCEL_MIS; |
| MCV | = | H230_MCV, | H230_CANCEL_MCV; |
| MIV | = | H230_MIV, | H230_CANCEL_MIV; |
| VCS | = | H230_VCS, | H230_CANCEL_VCS; |
| MCSMCN | = | H230_MCS, | H230_MCN; |
| AUDIOGRP | = | H221_A_Law_0U,<br>H221_G722_m1,<br>H221_A_Law_0F,<br>H221_A_Law_F6,<br>H221_G722_m2,<br>H221_Au_40K,<br>H221_Au_24K,<br>H221_Au_1t16K, | H221_U_Law_0U,<br>H221_Au_off_U,<br>H221_U_Law_0F,<br>H221_U_Law_F6,<br>H221_G722_m3,<br>H221_Au_32K,<br>H221_G728,<br>H221_Au_off_F; |
| VIDEOGRP | = | H221_Video_off,<br>H221_MRV, | H221_H261;<br>H221_H263; |
| DATAGRP | = | H221_T120_on, | H221_T_120_off; |
| H224MLP | = | H221_H224_MLP_on, | H221_H224_MLP_off; |
| H224LSD | = | H221_H224_LSD_on, | H221_H224_LSD_off; |
| H224MLP | = | H221_H224_HSD_on, | H221_H224_HSD_off; |

Fig. 4

VIDEO CONFERENCING METHOD AND APPARATUS WITH IMPROVED INITIALIZATION THROUGH COMMAND PRUNING

BACKGROUND OF THE INVENTION

1. Field of the Invention

The present invention relates to the field of video conferencing. More specifically, the present invention relates to the initialization of a video conference.

2. Background Information

Video conferencing refers to the act of conducting a conference or "virtual meeting" between two or more participants at different geographic endpoints. In a digital implementation, audio and video are streamed as "data" along with conventional textual and graphics data (hereinafter unless specifically delimited, the term "data" includes any one or more forms of these data). Because each endpoint in a video conference is typically capable of sending and receiving the various types of data according to multiple protocols and/or standards, e.g. audio and/or video protocols, endpoints usually go through a lengthy conference initialization process where the endpoints synchronize the various data exchange protocols prior to the start of the conference. During the initialization phase of a video conference, for example, both the local and the remote endpoints involved in the conference exchange information describing their respective audio and video operational capabilities or "caps" (as known to those skilled in the art of video conferencing). Once a minimum set of caps have been exchanged, the endpoint devices enter a second phase of initialization where audio, video, and data streaming may be initiated through commands known as "modes" (as known to those skilled in the art of video conferencing).

The initialization process typically involves the endpoints exchanging one or more sets of caps, and each endpoint subsequently transmitting modes to the other endpoints based on the established caps, before human interaction is possible. For example, in response to receiving a first cap-set, a first endpoint may respond by initializing audio and/or video subsystems based on the received cap-set. If the endpoint subsequently receives a second cap-set which varies from the first cap-set, the endpoint must close or reinitialize some or all of the previously initialized audio and/or video subsystems. Therefore, it is very common for audio, video, and data streaming to be turned on and off multiple times during the initialization process. Establishing these streaming channels as well as tearing them down is a complex process that may take from several seconds to half a minute and even longer. Turning video on only to immediately turn it off, for example, is inefficient and may increase user "connection" time as well as costs, without providing additional user communication time. Furthermore, in many systems, quickly oscillating states from on to off and back on again can expose performance limitations, synchronization bugs and system instabilities.

SUMMARY OF THE INVENTION

A method for pruning video conferencing mode commands is provided. The method includes receiving video conferencing mode commands, wherein each mode command causes a video conferencing function to be performed, categorizing the mode commands into mutually exclusive groups, and processing selected mode commands from one or more of the groups to represent the respective groups.

BRIEF DESCRIPTION OF THE DRAWINGS

The present invention will be more fully understood from the detailed description given below and from the accompanying drawings of various embodiments of the invention, which, however, should not be taken to limit the invention to the specific embodiments, but are for explanation and understanding only.

FIG. 4 is a table illustrating various mode command groupings according to one embodiment of the present invention.

DETAILED DESCRIPTION

Figure 1:
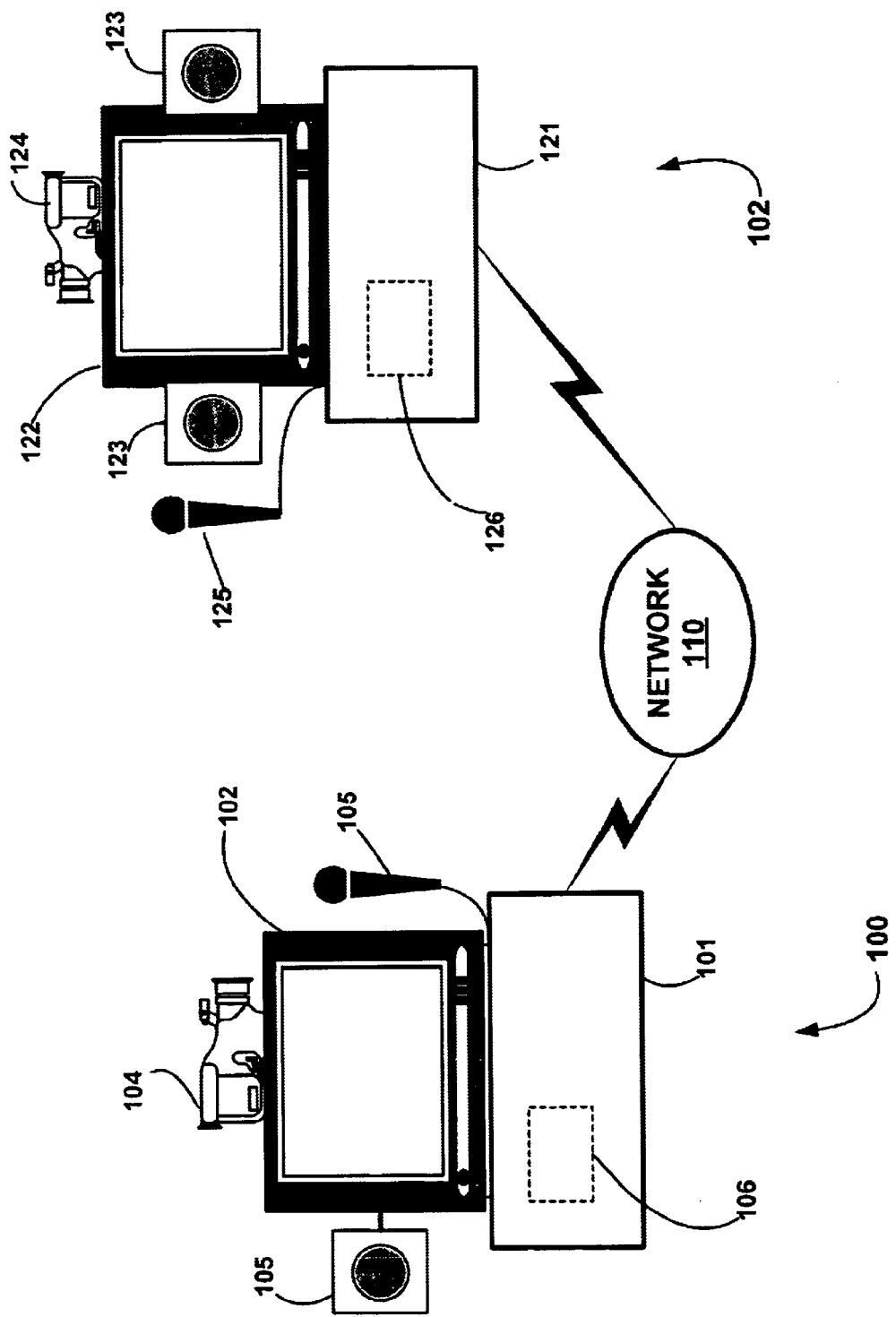
FIG. 1 illustrates a video conferencing system according to one embodiment of the present invention.

A video conferencing method and apparatus with improved initialization through command pruning is disclosed. The method and apparatus manages mode commands received from a remote endpoint of a video conference so as to minimize the repetitive establishment and tearing down of video, audio, and data streaming channels that is known in the art to occur. In one embodiment of the present invention, received mode commands are not immediately processed during call establishment of a video conference, but rather, the mode commands are stored in at least one data queue until the second phase of the capabilities exchange (i.e. initialization) is complete. In one embodiment, the received mode commands are categorized into groups of mutually exclusive mode commands based upon the functions caused by each mode command. In one embodiment, as the system removes the mode commands from the queue for processing, the system efficiently prunes the commands by processing only a selected sub-set of the grouped mode commands and ignoring the rest.

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art. Additionally, parts of the description will also be presented in terms of operations performed through the execution of programming instructions, using terms such as determining, selecting, processing and so on. As well understood by those skilled in the art, these operations are often accomplished through storing, transferring, combining, or otherwise manipulating electrical, magnetic, and/or optical signals.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

For ease of understanding, the remaining description will be presented in the context of the H.320 protocol, however, as will be apparent from the description to follow, the present invention is not limited to the H.320 protocol. Recommendation H.320(H.320), published July 1997, is available from International Telecommunications Union ("ITU") at http://www.itu.org. H.320 specifies technical requirements for narrow-band visual telephone systems and terminal equipment including video conferencing and videophone services. It describes a generic system configuration consisting of a number of elements which are specified by respective ITU recommendations including definition of communication modes and terminal types, call control arrangements, terminal aspects and interworking requirements. Although the present invention may be practiced within an H.320 system, it is not to be read as being limited to operation only within an H.320 system.

Similarly, numerous references are made herein to various ITU recommendations, such as H.261 (published March 1993), and H.263 (published February 1998), both of which are available from International Telecommunications Union "ITU" (at http://www.itu.org). Such references are made for explanatory purposes and should not be read as limiting the invention in any way. It will be appreciated by one skilled in the art that the invention described herein may similarly be applied to other recommendations and/or CODECs not mentioned.

As previously mentioned, initialization of each of the various endpoints of a video conference typically occurs before the actual conference may take place. During a first phase of the initialization, a connection between the various endpoints is established. In addition, during the first phase of initialization, the endpoints exchange their respective capabilities including, for example, the various audio and video algorithms, protocols and/or CODECs according to which the endpoints are capable of functioning. Following the establishment of a connection, the terminals begin to function in a default state as specified in Recommendation H.221 (H.221, published July 1997, and available from International Telecommunications Union ("ITU") at http://www.itu.org), thus signaling the completion of the first phase of initialization.

After the first phase of the initialization is complete, a second phase is initiated in which various modes may be exchanged. Endpoints will normally transmit according to the highest common mode, but lower compatible modes may also be chosen. Once a mode is established, the endpoints are then able to exchange various mode commands specifying the various video conferencing functions to be performed.

FIG. 1 represents a video conferencing system suitable for use with the present invention. A first local video conference endpoint 100 includes video conference control device 101, data storage device 106, video camera 104, microphone 105, speaker 103, and display device 102. Video conference control device 101 represents a general purpose computer equipped to execute video conferencing software stored within data storage device 106. In one embodiment, the efficient pruning method of the present invention is similarly embodied as software stored within data storage device 106. Both video camera 104 and microphone 105 represent devices known in the art to respectively capture video and audio for use in video conferencing systems. Display device 102 represents a generic computer monitor to display images received from a remote video conference endpoint such as, for example video conference endpoint 102.

Video conference endpoint 102 is connected to video conference endpoint 100 through network 110 as shown. Video conference endpoint 102 is configured similarly to video conference endpoint 100 and includes video conference control device 121, data storage device 126, video camera 124, microphone 125, speakers 123, and display device 122. As with video conference control device 101, video conference control device 121 likewise represents a general purpose computer equipped to execute video conferencing software stored in data storage device 126. Although the efficient pruning method of the present invention may also be embodied within video conference endpoint 102, for the purposes of clarity, the method is only discussed as being embodied within video conference endpoint 100.

During a video conference, images captured by video camera 104 and audio captured by microphone 105 are digitized and packetized, and the packets are transmitted through network 110 to video conference endpoint 102. At video conference endpoint 102, the images are recovered and displayed on display device 122 and the audio is recovered and emitted from speakers 123. Additionally, images captured by video camera 124 and audio detected by a microphone 125 are likewise packetized and transmitted through network 110 to be received by video conference endpoint 100. At video conference endpoint 100, the received images are recovered and displayed on display device 102 and the received audio is recovered and emitted from speaker 103.

Figure 2:
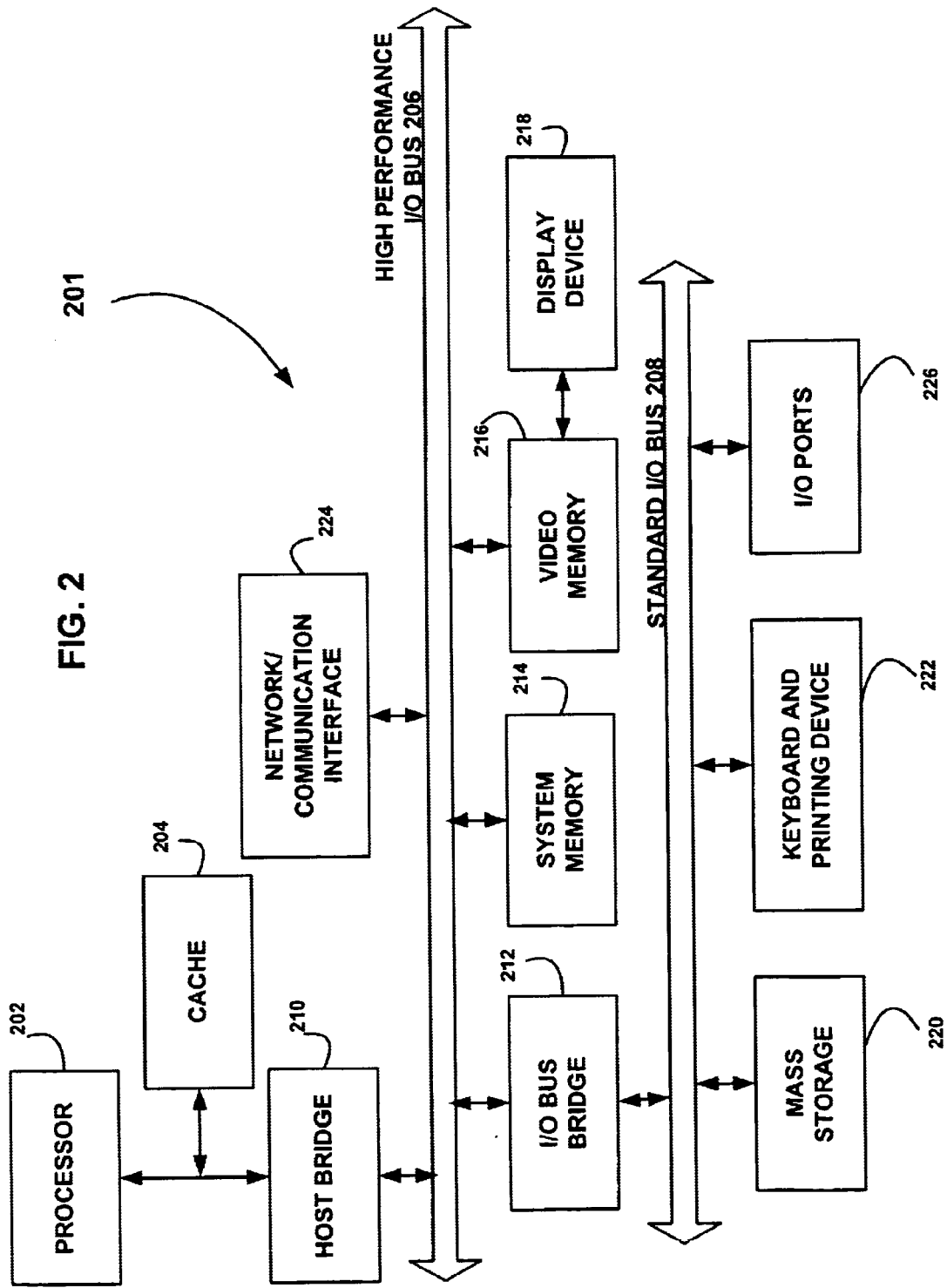
FIG. 2 is a block diagram illustrating one embodiment a video conference control device.

FIG. 2 is a block diagram illustrating one embodiment a video conference control device, such as video conference control device 101 of FIG. 1. In the illustrated embodiment, video conference control device 201 includes processor 202 and cache memory 204 coupled to each other as shown. Additionally, video conference control device 201 includes high performance input/output (I/O) bus 206 and standard I/O bus 208. Host bridge 210 couples processor 202 to high performance I/O bus 206, whereas I/O bus bridge 212 couples the two buses 206 and 208 to each other. Coupled to bus 206 are network interface 224, system memory 214, and video memory 216. Coupled to bus 208 is mass storage device 220, keyboard and pointing device 222, and I/O ports 226. Collectively, these elements are intended to represent a broad category of hardware systems, including, but not limited to general purpose computer systems based on the PENTIUM® processor, PENTIUM® II processor, or PENTIUM® III processor manufactured by Intel Corporation of Santa Clara, Calif.

Network interface 224 is used to provide communication between video conference control device 201 and any of a wide range of conventional networks, including, for example, network 110. It is to be appreciated that the circuitry of interface 224 may vary depending upon the type of network the video conference control device 201 is coupled to.

System memory 214 and video memory 216 are used to provide temporary data storage and represent any of the various volatile and non-volatile memory devices known in the art. Video memory 216 may additionally be coupled to a video display device that displays video output from video conference control device 201.

Mass storage 220 is used to provide extended or permanent storage for data and programming instructions to perform the functions described herein, whereas system memory 214 is used to provide temporary storage for the data and programming instructions when executed by processor 202.

I/O ports 226 represent one or more serial and/or parallel communication ports used to provide communication between additional peripheral devices which may be coupled to video conference control device 201, such as a video camera and/or a microphone.

It is to be appreciated that various components of video conference control device 201 may be re-arranged. For example, cache 204 may be on-chip with processor 202, or cache 204 and processor 202 may be packed together as a "processor module", with processor 202 being referred to as the "processor core". Furthermore, certain implementations of the present invention may not require nor include all of the above components. For example, keyboard and pointing device 222, and/or video memory 216 may not be included in video conference control device 201. Additionally, the peripheral devices shown coupled to standard I/O bus 208 may be coupled to high performance I/O bus 206. Furthermore, in some implementations, only a single bus may exist with the components of video conference control device 201 being coupled to the single bus. Additional components may also be included in video conference control device 201, such as dedicated audio and video processors, storage devices, memories, and so forth.

In one embodiment, elements of the present invention are implemented as a series of software routines run by video conference control device 201 of FIG. 2. These software routines comprise a plurality or series of instructions to be executed by a processor, such as processor 202, in video conference control device 201. Initially, the series of instructions are stored on a storage device, such as mass storage 220. It is to be appreciated that the series of instructions can be stored on any conventional storage medium, such as a diskette, CD-ROM, magnetic tape, DVD, ROM, etc. It is also to be appreciated that the series of instructions need not be stored locally, and could be received from a remote storage device, such as a server on a network, via network interface 224.

In one embodiment, the instructions are copied from the storage device, such as mass storage 220, into memory 214 and then accessed and executed by processor 202. In one implementation, these software routines are written in the C++ programming language. It is to be appreciated, however, that these routines may be implemented in any of a wide variety of programming languages. In alternative embodiments, the present invention may be implemented in discrete hardware or firmware. For example, an application specific integrated circuit (ASIC) could be programmed with the above described functions of the present invention.

Figure 3:
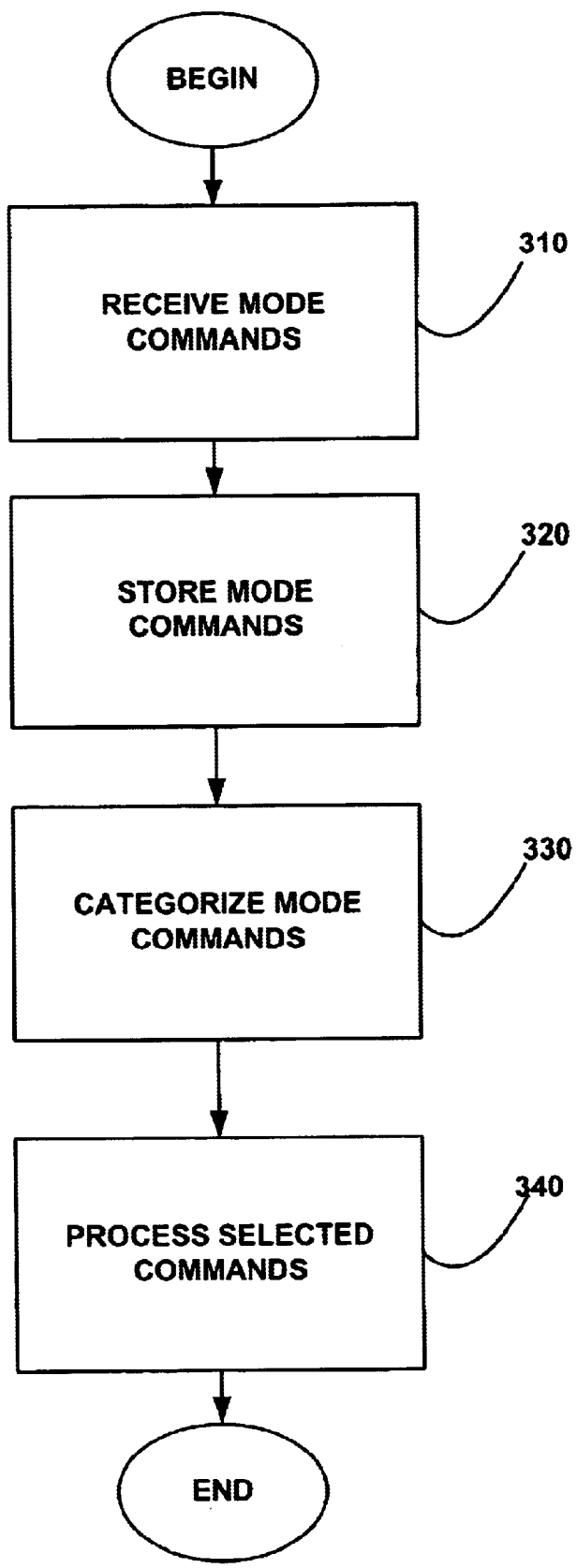
FIG. 3 is a flow diagram illustrating the operation of one embodiment of the present invention.

FIG. 3 is a flow diagram illustrating the operation of one embodiment of the present invention. Referring to FIG. 3, video conferencing mode commands are received from at least one remote endpoint of a video conference (310), and then stored in at least one mode queue (320). In one embodiment, the mode queue includes an index or pointer that is incremented every time a new mode command is stored within the mode queue. In one embodiment, the pointer is assigned a numerical value that indicates the location of each mode command with respect to each other mode command in the mode queue. In one embodiment, the mode commands are stored in the mode queue in the order that they are received. In other embodiments, however, the mode commands may be stored according to other orderings such as for example, by functional groupings of the mode commands.

Once the mode commands have been received, they are categorized into one or more groups each containing mutually exclusive mode commands (330). In one embodiment, the mode commands are logically separated into multiple functional groups, wherein each group consists of all the commands which control an audio, video, or data stream in a mutually exclusive manner. For example, according to one grouping scheme, H.261 ON, H.263 ON and VIDEO OFF commands all belong to the same group as they each result in a mutually exclusive change to the state of the video stream. That is, the H.261 ON command causes video to utilize all bandwidth capacity not otherwise allocated by other commands, whereas the VIDEO OFF command causes the video to be switched off. In such an instance, the system is directed to both increase video transmission capacity and turn video display off. Thus, the second mode command (VIDEO OFF) functionally subsumes the first mode command (H.261 ON).

By grouping mode commands in a mutually exclusive manner, it is possible to select only a subset of the received mode commands for which to process without negatively affecting the functionality of the video conferencing system. Since in the above example, the end result was for video to be turned off, the type of video transmission or bandwidth usage need not be processed as it is immaterial and does not affect the final state of the video conferencing system. One skilled in the art will appreciate that various mutually exclusive grouping schemes may similarly be implemented.

FIG. 4 is a table illustrating the various mode command groupings according to one embodiment of the present invention. Mode groups are shown in the first column, followed by the various mode commands included within each group. In one embodiment, the received mode commands are quickly categorized into one of the various groups shown in FIG. 4 using a hash function and a look-up table. An additional miscellaneous group (not shown) includes various mode commands that may be processed at any time without conflicting with any other mode commands. In one embodiment the miscellaneous mode commands are stored in the order received in the same data queue as the other mode commands, whereas in other embodiments the miscellaneous mode commands may be processed as soon as they are received.

Referring back to FIG. 3, according to one embodiment of the present invention, once the mode commands are received (310), stored (320), and categorized (330), a selected set of mode commands are processed (340). Certain mode commands within each group may be selected for processing over other mode commands based on a variety of criteria. For example, mode commands may be selected based upon assigned priorities wherein certain mode commands are given priority over, and therefore processed before, other mode commands. Alternatively, mode commands within a group may be selected for processing based upon the order in which they were received, as well as by the functions they cause.

In one embodiment of the present invention, the last received mode command for each mode group is selected for processing. For example, assume that the following string of mode commands are received at substantially the same time: "H.261 ON", "H.263 ON", "VIDEO OFF". Although the first and second mode commands specify a video transfer capacity, the third mode command, however, specifies that no video be transferred. More specifically, the third mode command specifies that video transfer be shut-off. Because in this example, the end-result to be achieved is VIDEO transfer OFF, and due to the mutually exclusive grouping of the mode commands, it is possible to ignore any mode commands belonging to the same group that are received prior to the VIDEO OFF command. Thus, by selecting only a subset of each group of mutually exclusive commands to process, extraneous and/or redundant mode commands may be efficiently eliminated from the initialization process, thereby decreasing initialization time. Furthermore, because oscillation between modes is minimized, the first audio, video, and data channels actually opened are likely to be the channels used for the entire conference, thereby decreasing instabilities.

Figure 5A:
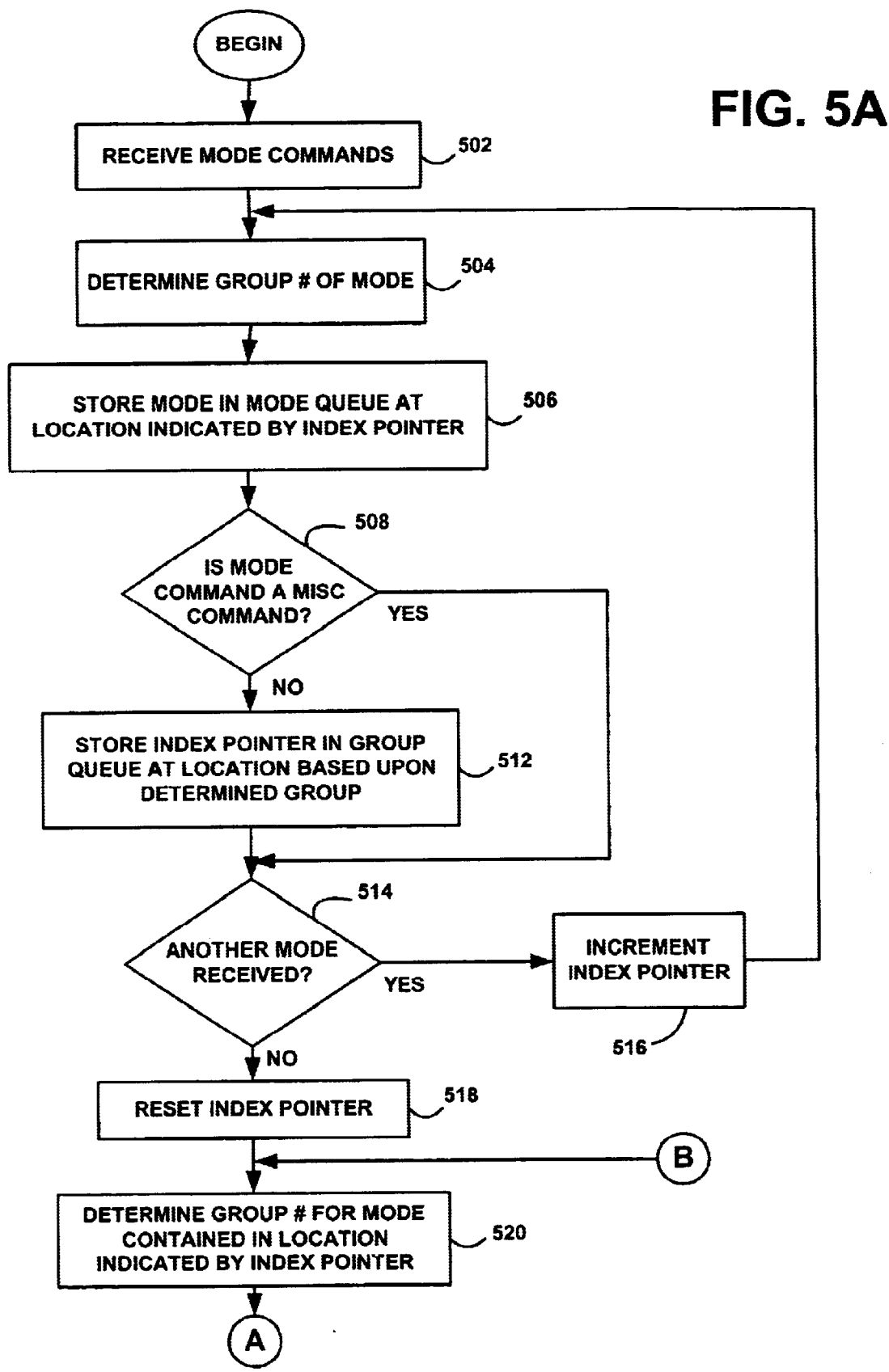
FIGS. 5A and 5B are a flow diagram illustrating mode command selection and processing according to one embodiment of the present invention.
Figure 5B:
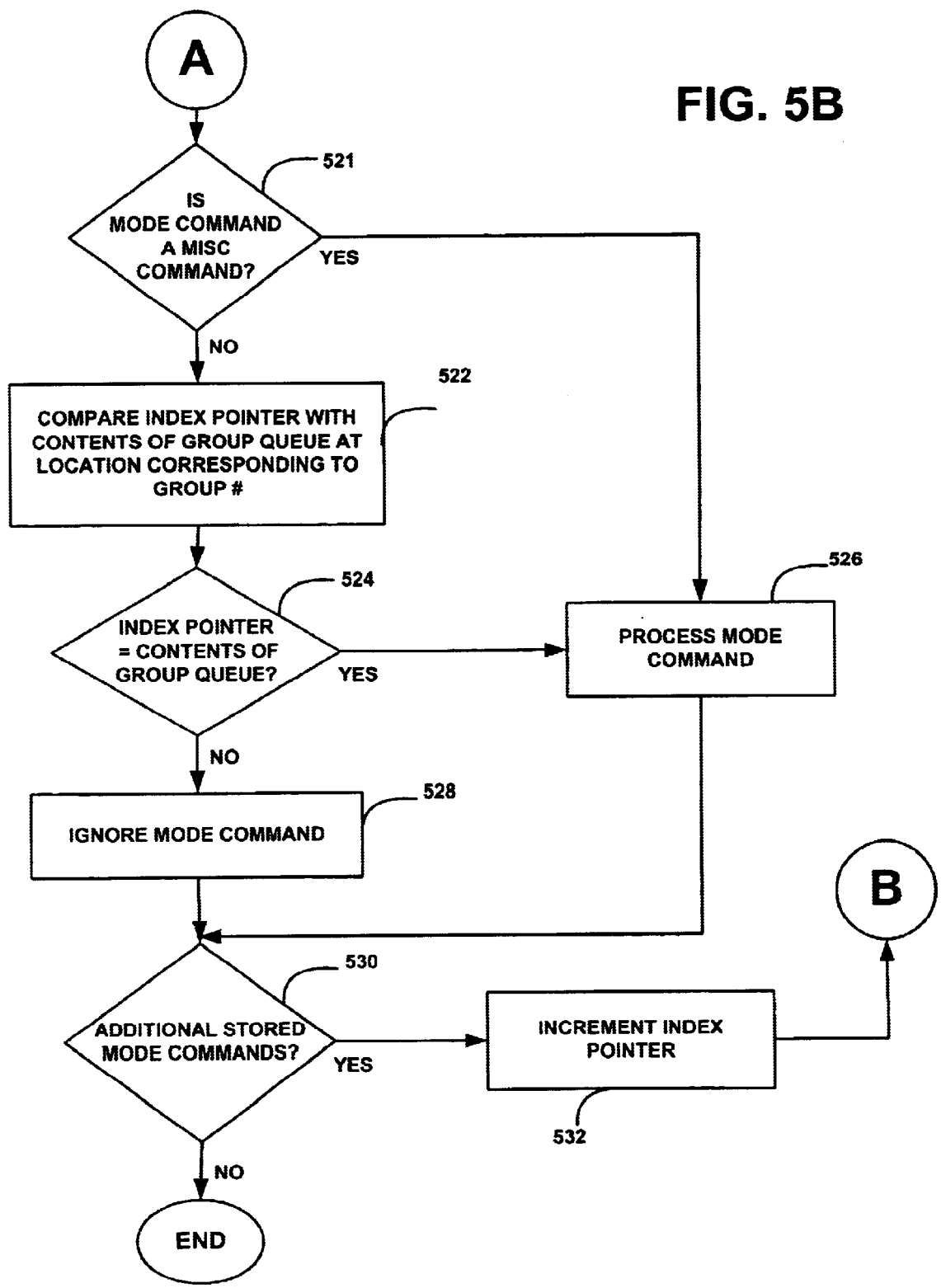

FIG. 5 is a flow diagram illustrating mode command selection and processing according to one embodiment of the present invention. Once mode commands are received by a video conferencing endpoint (502), the mode group to which each mode command belongs is determined (504) using, for example a hash function and a look-up table. In one embodiment, as mode commands are received, they are stored in a mode queue at a location indicated by an index pointer (506). If it is determined that a received mode command does not belong to the miscellaneous group (508), the value of the index pointer corresponding to the stored location of the mode command is itself stored in a group queue at a location associated with the command's mode group (512). If, however, it is determined that the received mode command does belong to the miscellaneous group, the value of the index pointer is not stored in the group queue.

For example, if a VIDEO OFF command is the first mode command to be received, it will be stored in the mode queue at a location having an offset of "01". Because the mode command does not belong to the miscellaneous group, but rather the video group, the offset "01" is stored in the group queue at a first location associated with the video group. If a received mode command does belong to the miscellaneous group, however, the mode command is stored in the mode queue, but the additional offset value is not stored in the group queue.

After one mode command is received, the system detects if another mode command has been received (514). If additional mode commands are received, the index pointer is incremented (516) and the mode group of each of the newly received mode commands is again determined (504). If, however, no further mode commands are received, the mode commands are then selectively processed.

During the selection procedure, the index pointer of the mode queue is first reset to the position at which it started receiving mode commands (518). The group number of the mode command stored in the mode queue at the location indicated by the index pointer is once again determined (520). If the mode command is a miscellaneous command (521) the mode command is processed without delay (526) and the system continues to process additionally stored commands (530). If, however, the mode command is not a miscellaneous command (521), a comparison is made between the value of the index pointer of the mode queue and the contents of a "prioritized" location, e.g. the first location, of the group queue corresponding to the determined group (522). If the value of the index pointer and the contents of the prioritized location of the group queue are the same (524) then the mode command is selected and processed (526). If, however, the value of the index pointer and the contents of the prioritized location of the group queue at the determined location are not the same, the mode command is ignored (528). The system then checks for the presence of additional mode commands stored within the mode queue (530). If additional mode commands are stored within the mode queue, the index pointer of the mode queue is incremented (532) and the mode group for the next mode command is determined (520). When no further mode commands are stored within the mode queue, processing ends.

In the process described above with respect to FIG. 5, the mode commands are stored and processed according to the order they were received. As previously mentioned, however, other methodologies may be used to store, select and process such mode commands. Furthermore, although a dual queue structure is described, various other implementations may equivalently be utilized. For example, the mode commands may be separated into groups of mutually exclusive mode commands, with each group having a dedicated queue. As a mode command is received, the appropriate mode group is determined and the command stored within that group's queue. Once all the mode commands have been received and queued, the various mode commands can be selected for processing based upon any number of algorithms.

Thus an efficient system for pruning video conferencing mode commands has been described. Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

What is claimed is:

1. In a video conferencing system, a method comprising:
   receiving a plurality of conferencing mode commands;
   categorizing the received mode commands into one or more groups containing mutually exclusive mode commands by assigning the received mode commands to functional groups that control at least one of audio, video and data stream in a mutually exclusive manner; and
   selecting for processing a categorized mode command from a subset of one of the groups to represent that group without changing the final state of the video conferencing system.

2. The method of claim 1, wherein for each of at least a subset of the received mode commands, categorizing the received mode commands into groups of manually exclusive mode commands comprises:
   determining a group to which the received mode command belongs;
   storing the received mode command in a region of a memory having an address; and
   storing the address in a region of memory that corresponds to the group to which the stored mode command belongs.

3. The method of claim 2,
   wherein storing the received mode command in a region of a memory having an address comprises storing the received mode command in a mode command queue at a location indicated by an index pointer; and
   wherein storing the address in a region of memory corresponding to the group to which the stored mode command belongs comprises storing a value of the index pointer in a queue corresponding to the group to which the received mode command belongs.

4. The method of claim 1, wherein, for of at least a subset of the received mode commands, categorizing the received mode commands into groups of mutually exclusive mode commands comprises:

determining a group to which the received mode commands belongs; and storing the received mode command in a region of memory that corresponds to the group to which the received mode command belongs.

5. The method of claim 4, wherein determining a group to which the received mode command belongs comprises referencing a lookup table containing mode commands and associated mode groups.

6. The method of claim 4, wherein storing the received mode command in a region of memory that corresponds to the group to which the received mode command belongs comprises storing the received mode command in a mode command queue that corresponds to the group to which the received mode command belongs.

7. The method of claim 1, wherein receiving a plurality of conferencing mode commands comprises receiving a plurality of video conference commands during an initialization phase of a video conference.

8. The method of claim 1, wherein categorizing the mode commands into groups of mutually exclusive mode commands comprises:

identifying the video conferencing function that each mode command causes to be performed; and grouping each mode command based upon its identified function.

9. The method of claim 1, wherein selecting for processing a categorized mode command from at least one of the groups to represent that group comprises selecting a last received mode command from at least one of the groups to represent that group.

10. The method of claim 1, wherein selecting for processing a categorized mode command from at least one of the groups to represent that group further comprises:

selecting for processing a categorized mode command from at least two of the groups, each selected mode command representing a group from which it was selected; and processing each selected mode command according to an order in which each selected mode command was received.

11. A video conferencing apparatus comprising:

a display device; and a processing system coupled with the display device to receive a plurality of conferencing mode commands, categorize the received mode commands into one or more groups containing mutually exclusive mode commands by assigning the received mode commands to functional groups that control at least one of audio, video and data stream in a mutually exclusive manner; and select for processing a categorized mode command from a subset of one of the groups to represent that group without changing the final state of the video conferencing system.

12. The apparatus of claim 11, further comprising a data storage device having at least one data queue to store the received mode commands.

13. The apparatus of claim 12, wherein a processing system coupled to the display device to categorize the received mode commands into groups of mutually exclusive mode commands comprises a processing system to, for each of at least a subset of the received mode commands:

determine a group to which the received mode con and belongs, store the received mode command in a mode command queue at a location indicated by an index pointer; and store a value of the index pointer into a queue corresponding to the group to which the received mode command belongs.

14. The apparatus of claim 13, wherein a processing system to determine a group to which the received mode command belongs comprises a processing system to reference a lookup table containing mode commands and associated mode groups.

15. The apparatus of claim 11, wherein a processing system coupled to the display device to select for processing a mode command from at least one of the groups to represent that group comprises a processing system to select a last received mode command from at least one of the groups to represent that group.

16. The apparatus of claim 11, wherein a processing system coupled to the display device to select for processing a mode command from at least one of the groups to represent that group comprises a processing system to:

select a mode command from at least two of the groups, each selected mode command representing a group from which it was selected; and process each selected mode command according to an order in which each selected mode command was received.

17. An article of manufacture comprising:

an electronically accessible medium providing instructions that, when executed by a machine, cause the machine to operate as a video conferencing endpoint and to:

receive a plurality of conferencing mode commands;

categorize the received mode commands into one or more groups containing mutually exclusive mode commands by assigning the received mode commands to functional groups that control at least one of audio, video and data stream in a mutually exclusive manner; and select for processing a categorized mode command from a subset of one it of the groups to represent that group without changing the final state of the video conferencing system.

18. The article of manufacture claim 17, wherein the instructions that cause the machine to categorize the mode commands into groups of mutually exclusive mode commands cause the machine to:

determine a group to which the received mode command belongs;

store the received mode command in a mode command queue at a location indicated by an index pointer; and store a value of the index pointer into a queue corresponding to the group to which the received mode command belongs.

19. The article of manufacture claim 17, wherein the instructions that cause the machine to categorize the mode commands into groups of mutually exclusive mode commands cause the machine to:

determine a group to which the received mode command belongs; and store the received mode command in a mode command queue that corresponds to the group to which the received mode command belongs.

20. A video conferencing system comprising:

a first videoconferencing endpoint; and a second videoconferencing endpoint connected to the first videoconferencing endpoint via a communications channel, wherein the first videoconferencing endpoint is to receive a plurality of video conferencing mode commands from the second videoconferencing endpoints, to categorize the received mode commands into two or more groups containing mutually exclusive mode commands by assigning the received mode commands to functional groups that consists of commands that control at least one of audio, video and data stream in a mutually exclusive manner, and to select for processing a subset of categorized mode commands from each of the two or more groups to represent that respective group without changing the final state of the video conferencing system.

21. The system of claim 20, wherein the first video conferencing endpoint selects a mode command from each of the two or more groups of mutually exclusive mode commands for processing.

22. The system of claim 21, wherein a most recently received mode command from each of the two or more groups of mutually exclusive mode commands is selected.

23. In a video conferencing system, a method comprising:

receiving a plurality of conferencing mode commands;

categorizing the received mode commands into one or more groups containing mutually exclusive mode commands by assigning the received mode commands to functional groups that consists of commands that control at least one of audio, video and data stream in a mutually exclusive manner; and pruning the received mode commands by choosing from a subset of one of the groups to represent that group without changing the final state of the video conferencing system.

24. The method of claim 23, wherein, for each of at least a subset of the received mode commands, categorizing the received mode commands into groups of mutually exclusive mode commands comprises:

determining a group to which the received mode command belongs;

storing the received mode command in a region of memory having an address; and storing the address in a region of memory that corresponds to the group to which the stored mode command belongs.

25. The method of claim 24, wherein storing the received mode command in a region of memory having an address comprises storing the received mode command in a mode command queue at a location indicated by an index pointer; and wherein storing the address in a region of memory that corresponds to the group to which the stored mode command belongs comprises storing a value of the index pointer into a queue corresponding to the group to which the received mode command belongs.

26. The method of claim 23, wherein, for each of at least a subset of the received mode commands, categorizing the received mode commands into groups of mutually exclusive mode commands comprises:

determining a group to which the received mode belongs; and storing the received mode command in a region of memory that corresponds to the group to which the received mode commands belongs.

27. The method of claim 26, wherein storing the received mode command in a region of memory that corresponds to the group to which the received mode commands belongs comprises storing the received mode command in a mode command queue that corresponds to the group to which the received mode command belongs.

* * * * *

UNITED STATES PATENT AND TRADEMARK OFFICE
CERTIFICATE OF CORRECTION

PATENT NO. : 6,774,927 B1
DATED : August 10, 2004
INVENTOR(S) : Cohen et al.

It is certified that error appears in the above-identified patent and that said Letters Patent is hereby corrected as shown below:

<u>Column 8,</u>
Line 46, delete "manually" and insert -- mutually --.
Line 66, after "for", insert -- each --.

<u>Column 9,</u>
Line 66, delete "con and" and insert -- command --.

<u>Column 10,</u>
Line 40, delete "it".

<u>Column 11,</u>
Line 4, delete "endpoints" and insert -- endpoint --.

Signed and Sealed this

Thirtieth Day of November, 2004

JON W. DUDAS
*Director of the United States Patent and Trademark Office*